United States Patent
Yeon (10) Patent No.: US 10,115,220 B2
(45) Date of Patent: Oct. 30, 2018

(54) METHOD AND APPARATUS FOR CHANGING 3D DISPLAY BASED ON ROTATION STATE

(71) Applicant: Samsung Electronics Co., Ltd., Gyeonggi-do (KR)

(72) Inventor: Su-jin Yeon, Seoul (KR)

(73) Assignee: Samsung Electronics Co., Ltd (KR)

( * ) Notice: Subject to any disclaimer, the term of this patent is extended or adjusted under 35 U.S.C. 154(b) by 116 days.

(21) Appl. No.: 13/739,584

(22) Filed: Jan. 11, 2013

(65) Prior Publication Data

US 2013/0176301 A1 Jul. 11, 2013

(30) Foreign Application Priority Data

Jan. 11, 2012 (KR) .................. 10-2012-0003352

(51) Int. Cl.
*G06T 15/00* (2011.01)
*H04N 13/00* (2018.01)
*G09G 5/00* (2006.01)
*G09G 3/00* (2006.01)

(52) U.S. Cl.
CPC ............. *G06T 15/00* (2013.01); *G09G 5/00* (2013.01); *H04N 13/007* (2013.01); *H04N 13/0022* (2013.01); *G09G 3/003* (2013.01); *G09G 2340/0492* (2013.01); *G09G 2340/14* (2013.01); *G09G 2354/00* (2013.01)

(58) Field of Classification Search
USPC ........................................................ 345/419
See application file for complete search history.

(56) References Cited

U.S. PATENT DOCUMENTS

| | | | |
|---|---|---|---|
| 8,692,853 B2 * | 4/2014 | Kim et al. | 345/679 |
| 9,041,779 B2 | 5/2015 | Yoshino | |
| 2007/0046630 A1 | 3/2007 | Hong et al. | |
| 2010/0188503 A1 * | 7/2010 | Tsai et al. | 348/142 |
| 2010/0189413 A1 | 7/2010 | Yoshino | |
| 2010/0208040 A1 | 8/2010 | Guillou | |
| 2010/0238196 A1 * | 9/2010 | Hinterberger et al. | 345/649 |

(Continued)

FOREIGN PATENT DOCUMENTS

| | | |
|---|---|---|
| EP | 2 346 263 | 7/2011 |
| EP | 2 346 264 | 7/2011 |

(Continued)

OTHER PUBLICATIONS

European Search Report dated Aug. 13, 2015 issued in counterpart application No. 13735681.2-1903, 9 pages.

(Continued)

*Primary Examiner* — Kumar Patel
*Assistant Examiner* — Richard M Russell
(74) *Attorney, Agent, or Firm* — The Farrell Law Firm, P.C.

(57) ABSTRACT

A Three-Dimensional (3D) display method is provided, and includes displaying a 3D screen including a plurality of objects having different depth perceptions, and displaying the 3D screen with a unified depth perception through adjustment of the depth perceptions of the plurality of objects to one depth perception, when a 3D display apparatus moves to a first state. Accordingly, it is possible to effectively control the operation of the display apparatus while viewing the 3D screen.

20 Claims, 8 Drawing Sheets

(56) References Cited

U.S. PATENT DOCUMENTS

| | | | |
|---|---|---|---|
| 2011/0093778 A1 | 4/2011 | Kim et al. | |
| 2011/0126159 A1 | 5/2011 | Ko et al. | |
| 2011/0126160 A1 | 5/2011 | Han et al. | |
| 2011/0221777 A1* | 9/2011 | Ke | 345/649 |
| 2011/0254846 A1* | 10/2011 | Lee | G06F 3/011 345/427 |
| 2012/0001943 A1* | 1/2012 | Ishidera | 345/659 |
| 2012/0081359 A1* | 4/2012 | Lee | G06F 3/04815 345/419 |
| 2013/0113783 A1* | 5/2013 | Pourbigharaz | 345/419 |
| 2015/0172643 A1 | 6/2015 | Yoshino | |
| 2015/0189260 A1 | 7/2015 | Yoshino | |

FOREIGN PATENT DOCUMENTS

| | | |
|---|---|---|
| EP | 2 448 275 | 5/2012 |
| EP | 2 448 276 | 5/2012 |
| EP | 2 448 277 | 5/2012 |
| EP | 2 456 214 | 5/2012 |
| EP | 2 456 215 | 5/2012 |
| EP | 2 456 216 | 5/2012 |
| EP | 2 456 217 | 5/2012 |
| EP | 2 456 218 | 5/2012 |
| JP | 2006-293878 | 10/2006 |
| JP | 2010-175643 | 8/2010 |
| JP | 2010-257160 | 11/2010 |
| JP | 2011028263 | 2/2011 |
| KR | 1020110026811 | 3/2011 |
| KR | 1020110054256 | 5/2011 |
| KR | 1020110056775 | 5/2011 |
| KR | 1020110086415 | 7/2011 |
| WO | WO 2008/030005 | 3/2008 |
| WO | WO 2011/123178 | 10/2011 |

OTHER PUBLICATIONS

Korean Office Action dated Jan. 29, 2018 issued in counterpart application No. 10-2012-0003352, 7 pages.

European Search Report dated Jul. 17, 2018 issued in counterpart application No. 13735681.2-1209, 7 pages.

* cited by examiner

METHOD AND APPARATUS FOR CHANGING 3D DISPLAY BASED ON ROTATION STATE

PRIORITY

This application claims priority under 35 U.S.C. § 119(a) to Korean Patent Application No. 10-2012-0003352, which was filed in the Korean Intellectual Property Office on Jan. 11, 2012, the content of which is incorporated herein by reference.

BACKGROUND OF THE INVENTION

1. Field of the Invention

The present invention relates generally to a Three-Dimensional (3D) display apparatus and a method thereof, and more particularly to a 3D display apparatus and a method that can change a screen display state depending on the rotating state of the 3D display apparatus.

2. Description of the Related Art

With the development of electronic technology, various types of electronic devices have been developed and spread. In particular, types of display devices, such as a Television (TV), a mobile phone, a Personal Computer (PC), a notebook PC, and a Personal Data Assistant (PDA), have been widely used even in private homes.

As the use of display devices is increased, user needs for more diverse functions have increased. In order to meet such user needs, respective manufacturers have successively developed products having new functions.

Therefore, devices having 3D display functions have recently proliferated. Such devices may be implemented by devices such as a 3D TV used in homes and in devices such as a 3D television receiver, monitors, a mobile phone, a PDA, a set top PC, a tablet PC, a digital photo frame, and a kiosk. Further, 3D display technology may be used in diverse fields that require 3D imaging, such as science, medicine, design, education, advertisement, and computer games.

In a 3D display apparatus, a screen that includes a plurality of objects having different depth perceptions is displayed. A user perceives the 3D effect due to a difference in depth perception between respective objects. However, when a user intends to control the operation of the 3D display apparatus, the user may require a 3D screen. That is, various types of menus, which are displayed on the screen to control the operation of the 3D display apparatus, may visually conflict with the objects that are displayed in 3D on the screen. Further, the menus may be hidden by the objects being displayed or the objects may be hidden by the menus being displayed on the screen to cause the menu selection and operation to be difficult.

SUMMARY OF THE INVENTION

The present invention has been made to address at least the above problems and/or disadvantages and to provide at least the advantages described below.

Accordingly, an aspect of the present invention provides a 3D display apparatus and a method thereof, which can adjust the depth perceptions of objects displayed on a screen if the apparatus is rotated while a 3D display is performed.

According to one aspect of the present invention, a 3D display method in a 3D display apparatus includes displaying a 3D screen including a plurality of objects having different depth perceptions, and displaying the 3D screen with a unified depth perception through adjustment of the depth perceptions of the plurality of objects to one depth perception if the 3D display apparatus moves to a first state.

According to another aspect of the present invention, a 3D display apparatus includes a display unit displaying a 3D screen including a plurality of objects having different depth perceptions, a sensing unit sensing a movement state of the 3D display device, and a control unit controlling the display unit to display the 3D screen with a unified depth perception through adjustment of the depth perceptions of the plurality of objects to one depth perception if the 3D display apparatus moves to a first state.

According to embodiments of the present invention, the screen display state is changed depending on the rotating state of the 3D display apparatus, and thus the user can control the operation of the 3D display apparatus more conveniently and easily.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS OF THE INVENTION

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Figure 1:
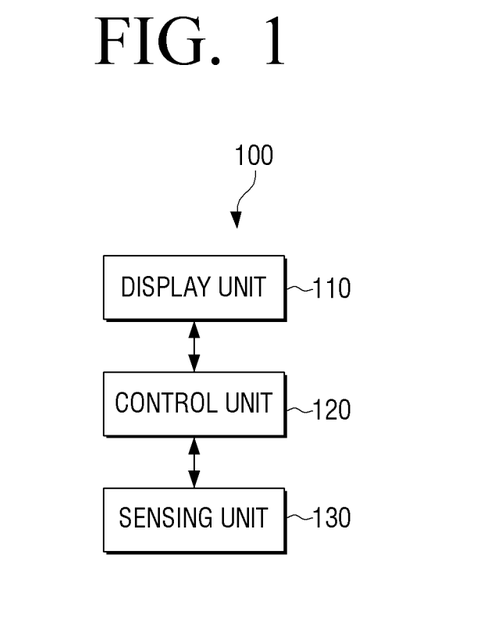
FIG. 1 illustrates the configuration of a 3D display apparatus according to an embodiment of the present invention.

FIG. 1 illustrates the configuration of a 3D display apparatus according to an embodiment of the present invention. A 3D display apparatus according to an embodiment of the present invention may be implemented by a device having mobility, such as a mobile phone, a PDA, a tablet PC, an electronic book, or a digital photo frame.

Referring to FIG. 1, the display unit 110 displays a 3D screen including a plurality of objects having different depth perceptions. The 3D screen means a screen which displays, in a 3D method, content provided from a storage device (not illustrated) that is provided in or connected to the 3D display apparatus 100, various types of recording medium reproduction devices (not illustrated) connected to the 3D display apparatus 100, or an external source (not illustrated) such as a broadcasting station or a web server. Examples of the 3D screen may include a broadcasting program screen, a multimedia content reproduction screen, an application execution screen, and a web page screen. The application execution screen means a screen that is provided when an application installed in the 3D display apparatus 100 or the external device is executed.

The display unit 110 may be driven in manners depending on the 3D display method. That is, the 3D display method may be divided into a glasses type and a non-glasses type depending on whether 3D glasses are worn. The glasses type 3D display method may be further divided into a shutter glass type and a polarization type.

The shutter glass type 3D display method is a method in which a synchronization signal is transmitted to the 3D glasses so that a left-eye shutter glass and a right-eye shutter glass are alternately opened at a corresponding image output time while a left-eye image and a right-eye image are alternately displayed through the display unit 110. When the shutter glass type 3D display method is performed, the display unit 110 alternately displays the left-eye image and the right-eye image. The left-eye image and the right-eye image mean image frames configured so that the same objects are spaced apart from each other to have disparities corresponding to the depth perceptions of the objects. For example, if object 1 displayed in the left-eye image and object 1 displayed in the right-eye image are spaced apart from each other for disparity 1, and if object 2 displayed in the left-eye image and object 2 displayed in the right-eye image are spaced apart from each other for disparity 2, the depth perceptions of object 1 and object 2 become different from each other.

The polarization type 3D image display method is a method in which a left-eye image and a right-eye image are divided for each line, and the divided left-eye image line and right-eye image line are alternately arranged to generate and output at least one image frame. In this case, the display unit 110 causes the respective lines have different polarization directions by using a polarizing film attached to a panel. The 3D glasses that a user wears have the left-eye glass and the right-eye glass that transmit lights having different polarization directions. Accordingly, the left-eye image line is only recognized by the left eye, and the right-eye image line is recognized only by the right eye, so that a viewer can feel the 3D effect corresponding to the object disparity between the left-eye image and the right-eye image. In the case of the non-glass type 3D image display method, the display unit 110 includes a lenticular lens array or a parallax barrier. The display unit 110 divides the left-eye image and the right-eye image for each line and alternately arranges the respective lines to form and display at least one image frame. The light for each line of the image frame is dispersed to a plurality of viewing areas by the lenticular lens array or the parallax barrier. The respective viewing areas may be formed at an interval of about 65 mm that is the binocular disparity of a human.

The left-eye image and the right-eye image may form a 3D image of broadcasting content or multimedia reproduction content, or a 3D image that includes types of User Interface (UI) windows or objects, such as widget, image, and text.

The sensing unit 130 senses the motion state of the 3D display apparatus 100. The motion states include states to which the 3D display apparatus can move, such as an inclined state, a rotating state, and a movement state. The sensing unit 130 may include a geomagnetic sensor, a gyro sensor, and an acceleration sensor. Accordingly, the sensing unit 130 can sense whether the 3D display apparatus 100 is placed in the vertical direction or in the horizontal direction, or whether the 3D display apparatus 100 is in the horizontal state or in an inclined state, through measurement of a rotating angle, a pitch angle, a yaw angle, and a roll angel of the 3D display apparatus 100.

The sensing unit 130 may be implemented to include at least one of the types of sensors as described above, and its sensing method may differ depending on the type of the sensor. For example, when the sensing unit is provided with a two-axis fluxgate geomagnetic sensor, the sensing unit measures the size and direction of an external magnetic field through sensing the size of an electrical signal of the two-axis fluxgate that is changed depending on the rotating state thereof. Since the output values detected from the respective fluxgates is affected by the inclination, the pitch angle, the roll angle, and the yaw angle of the 3D display apparatus 100 may be calculated using the output values. If the pitch angle and the roll angle become "0", the sensing unit 130 determines that the 3D display apparatus 100 is placed in the horizontal state based on the ground surface, while if the pitch angle and the roll angle become 90 degrees, the sensing unit 130 determines that the 3D display apparatus 100 is put upright in the vertical or horizontal direction. The sensing unit 130 can also determine the rotating direction of the 3D display apparatus according to the size and sign of the yaw angle. These values may differ depending on the direction of the sensor put in the 3D display apparatus 100.

In addition, the sensing unit 130 may adopt types of sensors that are known in the art, and the detailed description and illustration thereof will be omitted.

The control unit 120 controls the operation of the display unit 110 depending on the result of the sensing by the sensing unit 130. Specifically, if it is sensed that the 3D display apparatus 100 moves to the first state, the control unit 120 may control the display unit 110 to unify the depth perceptions of the respective objects that are being displayed through the display unit 110 into one depth perception.

The display unit 110 may unify the depth perceptions by adjusting the disparity through shifting the positions of the objects displayed in the left-eye image and the right-eye image for forming the 3D screen.

Further, according to an embodiment of the present invention, the first state may be defined in several manners. For example, the first state may be a horizontal state in which the 3D display apparatus 100 is horizontally put on the ground surface, a state in which the 3D display apparatus 100 is rotated in a horizontal or vertical direction, a state in which the 3D display apparatus 100 is inclined over a predetermined inclination, a state in which the 3D display apparatus 100 is rotated over a predetermined rotating angle, a state in which the 3D display apparatus 100 moves toward or away from the user side while maintaining the inclination, or a state in which the 3D display apparatus 100 is moving to form a specified pattern. In the description, it is assumed that the horizontal state is defined as the first state.

Figure 2:
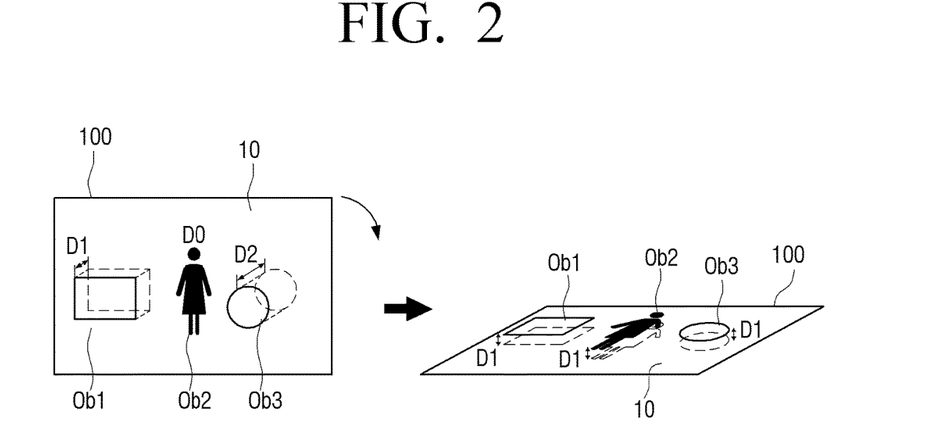
FIGS. 2 to 6 illustrate a 3D display method in a 3D display apparatus according to embodiments of the present invention.

FIG. 2 illustrates the operation of a 3D display apparatus according to an embodiment of the present invention. Referring to FIG. 2, the 3D display apparatus 100 displays a 3D screen 10 in a state in which the 3D display apparatus 100 is inclined at a predetermined inclination based on the horizontal surface. On the 3D screen 10, a plurality of objects Ob1, Ob2, and Ob3 having different depth perceptions are displayed. The depth perceptions of the respective objects Ob1, Ob2, and Ob3 are denoted by D0, D1, and D2. D0 denotes the depth feeling which corresponds to the same plane as the screen of the 3D display apparatus 100, D1 denotes the depth feeling which corresponds to a plane that projects for a predetermined distance from the screen in a user direction, and D2 denotes the depth perception which corresponds to a plane that projects further from D1.

If the 3D display apparatus 100 is rotated in a state in which the 3D screen 10 that includes the respective objects Ob1, Ob2, and Ob3 is displayed, the depth perceptions of the respective objects Ob1, Ob2, and Ob3 are adjusted to be unified into one depth perception. That is, as shown in FIG. 2, the depth perceptions of the objects are unified into D1. Although it is shown that the depth perceptions of the objects are unified into D1 in FIG. 2, the depth perceptions of the objects may also be unified into D2 or another depth perception through which the 3D display state can be recognized. Further, although it is shown that the depth perceptions of the objects are unified into one depth perception in FIG. 2, it is also possible to unify the depth perceptions of the objects are unified into about two depth perceptions. For example, when objects having six depth perceptions, such as D0 to D5, are displayed, the depth perceptions D0, D1, and D2 may be unified into D1, and the depth perceptions D3, D4, and D5 may be unified into D2 to be displayed.

Although it is shown that only the depth perceptions are adjusted depending on the motion of the 3D display apparatus 100 in FIG. 2, the screen configuration may be changed simultaneously with the adjustment of the depth perceptions.

Figure 3:
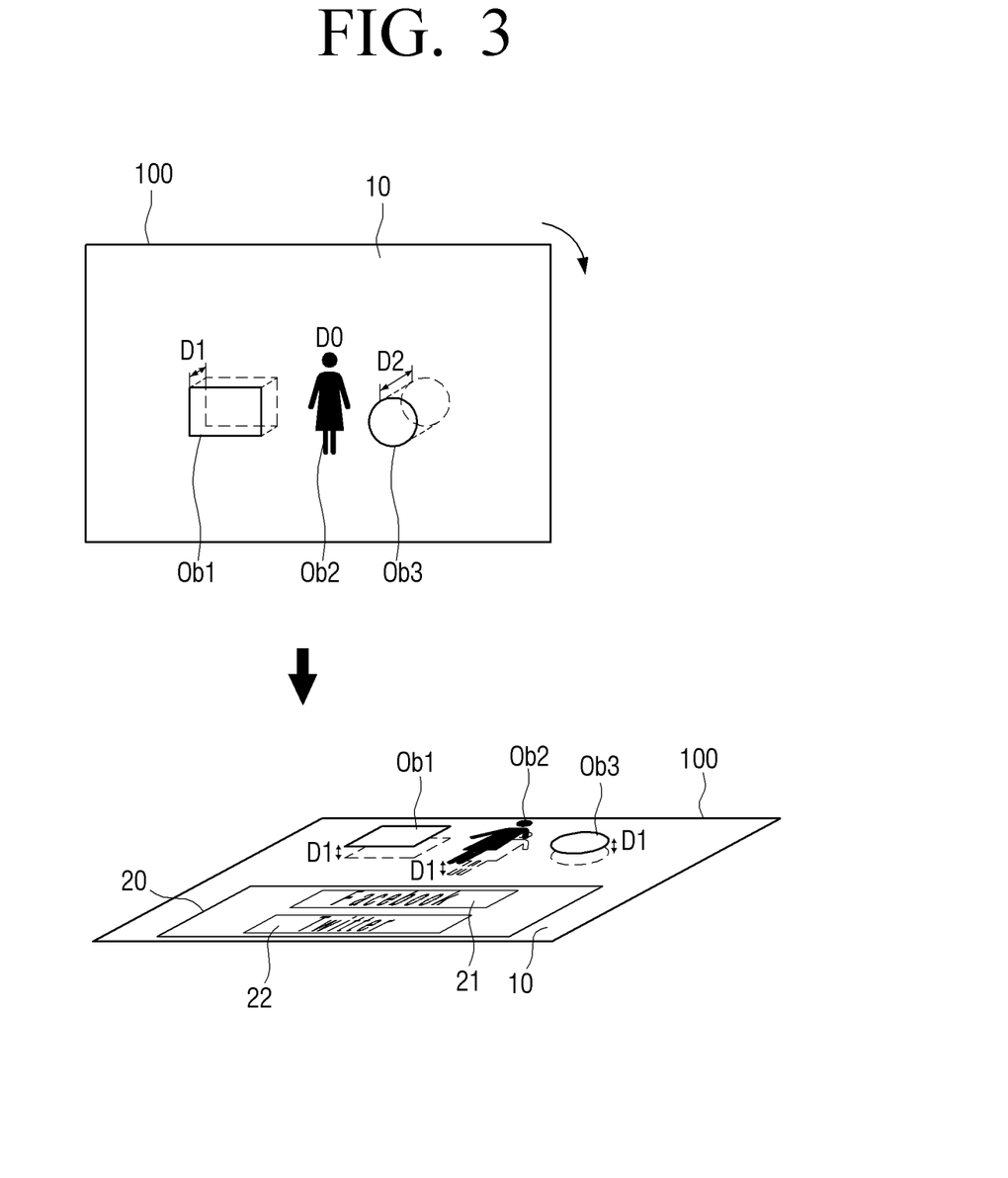

Referring to FIG. 3, if the 3D display apparatus 100 is rotated to the horizontal state while displaying the 3D screen 10 that includes the respective objects Ob1, Ob2, and Ob3, the depth perceptions of the objects Ob1, Ob2, and Ob3 are unified into D1, and a menu 20 for the 3D screen 10 is displayed. The menu 20 includes types of selection menus 21 and 22 related to the 3D screen 10 currently displayed. The selection menu related to the 3D screen 10 indicates a menu that can be selected to perform control, such as usage, adjustment, sharing, and edition, with respect to content. For example, if the 3D screen 10 is a content reproduction screen, a reproduction or pause menu, a stop menu, a fast-forward menu, a rewind menu, and a reproduction time display menu, may be included in the menu 20. As shown in FIG. 3, icons of types of applications related to the 3D screen 10 may be implemented through the selection menus 21 and 22.

Figure 4:
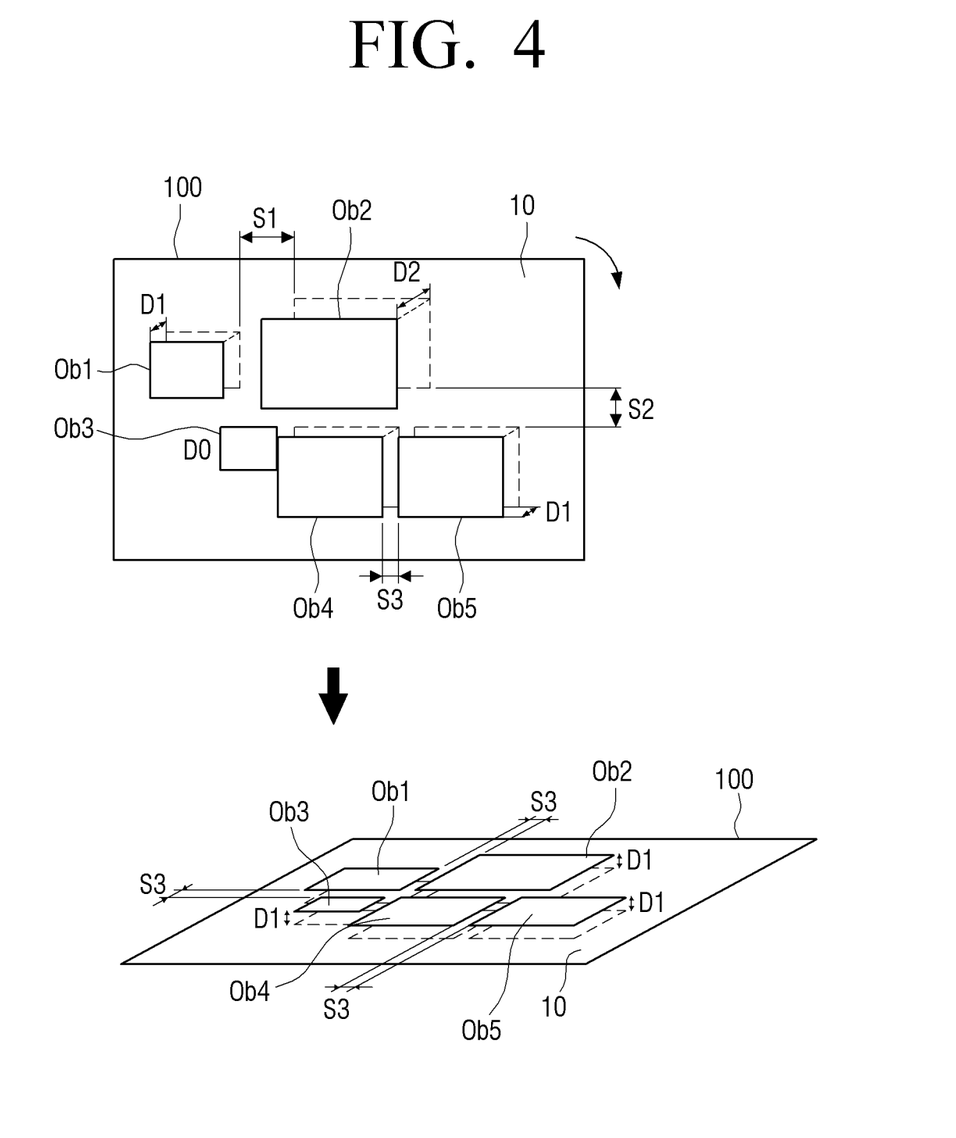

FIG. 4 illustrates a 3D display method according to another embodiment of the present invention. Referring to FIG. 4, if the 3D display apparatus is rotated to the horizontal state while displaying the 3D screen 10 that includes the respective objects Ob1, Ob2, and Ob3 having the different depth perceptions D0, D1, an D2, the depth perceptions of the objects Ob1, Ob2, and Ob3 are unified into one depth value, and the layout of the 3D screen 10 is changed. The layout change may be performed in manners according to embodiments of the present invention. That is, the respective objects Ob1, Ob2, and Ob3 that are dispersed at arbitrary positions may be regularly arranged for display. However, the distances among the respective objects Ob1, Ob2, and Ob3 or their sizes or shapes, may be constantly unified. FIG. 4 shows the instance when the distances among the respective objects Ob1, Ob2, and Ob3 are unified. Before the 3D screen 10 is rotated, the respective objects Ob1, Ob2, and Ob3 have different distances s1, s2, and s3, but after the 3D screen 10 is rotated, the layout is changed so that the objects have the same distance s3.

Such layout change may be selectively performed depending on the types of content displayed on the 3D screen 10. That is, the distances for general objects, as shown in FIG. 4, may be adjusted or other feature elements, such as the shapes and sizes, may be adjusted. However, for objects included in multimedia content, such as movie or broadcasting content, and photo content, the layout change may not be performed.

The above-described layout change may be differently applied depending on the types of content. That is, if there are objects present that belong to the same type, such as a plurality of images or menu icons, the layout may be changed so that the distances, sizes, and shapes of the objects coincide with one another for each type. By contrast, if a plurality of objects having different types is present, the layout may be change so that the objects are grouped for each type.

When the distances among the objects are unified as shown in FIG. 4, the minimum distance among the distances s1, s2, and s3 of the respective objects may be set as the unified distance. Another default value may be set as the unified distance.

As shown in FIGS. 2 to 4, if the 3D display apparatus 100 moves to the first state to achieve the depth perception adjustment, and then moves to the original state, the unified depth perception is adjusted to return to the original depth perceptions.

In particular, if the 3D display apparatus 100 moves to the original state after the menu display or the layout change is performed as shown in FIGS. 3 and 4, the menu display may be removed, and the layout may be changed to the original state.

In the embodiments illustrated in FIGS. 3 and 4, it is shown that the menu display or the layout change is performed together with the depth perception unification through the movement of the 3D display apparatus 100 to the first state. However, such operations may be performed through different motions separately from the depth perception unification operation. These embodiments will be described with reference to FIGS. 5 and 6.

Figure 5:
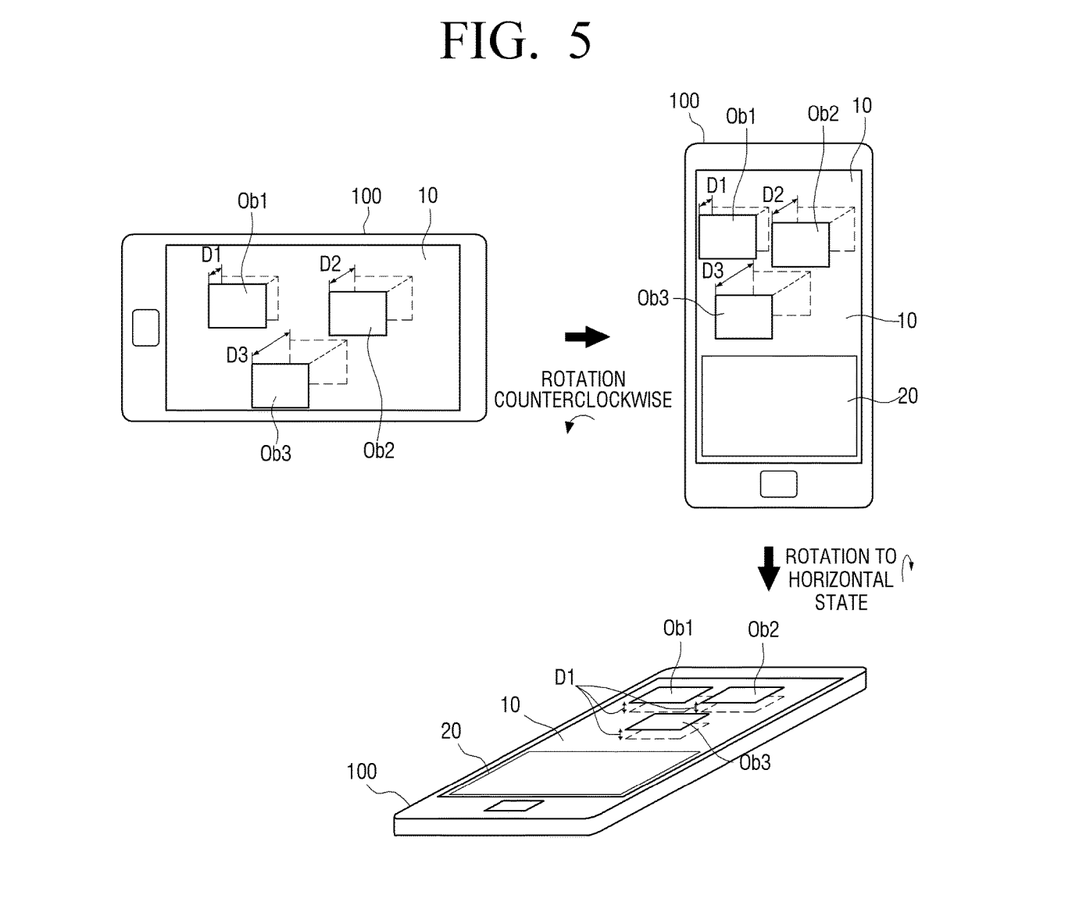

FIG. 5 illustrates a 3D display method according to another embodiment of the present invention. Referring to FIG. 5, if the 3D display apparatus 100 is rotated to a second state in a state in which the 3D screen 10 that includes the plurality of objects Ob1, Ob2, and Ob3 having different depth perceptions D1, D2, and D3 is displayed, a menu 20 is displayed on the 3D screen 10 while the depth perceptions of the respective objects Ob1, Ob2, and Ob3 are maintained. Although FIG. 5 shows that the second state is a state in which the 3D display apparatus 100 is rotated counterclockwise, the second state is not limited thereto. That is, the second state may include a state in which the 3D display apparatus 100 is rotated clockwise and a state in which the 3D display apparatus 100 is inclined to the front side or the rear side. Further, although FIG. 5 shows that the 3D display apparatus 100 is put in the horizontal direction to be used and then is turned in the vertical direction, the menu 20 may be displayed even instance when the 3D display apparatus 100 is turned from the vertical direction to the horizontal direction according to the embodiment of the present invention.

If the 3D display apparatus 100 is rotated to the first state in a state in which the 3D display apparatus 100 is rotated to the second state and the menu 20 is displayed, the depth perceptions of the respective objects Ob1, Ob2, and Ob3 are unified into one depth perception in a state in which the menu 20 is displayed. FIG. 5 shows the state in which the depth perceptions are unified into D1. As described above, the user can operate the menu 20 without being visually affected with respect to the 3D screen.

Figure 6:
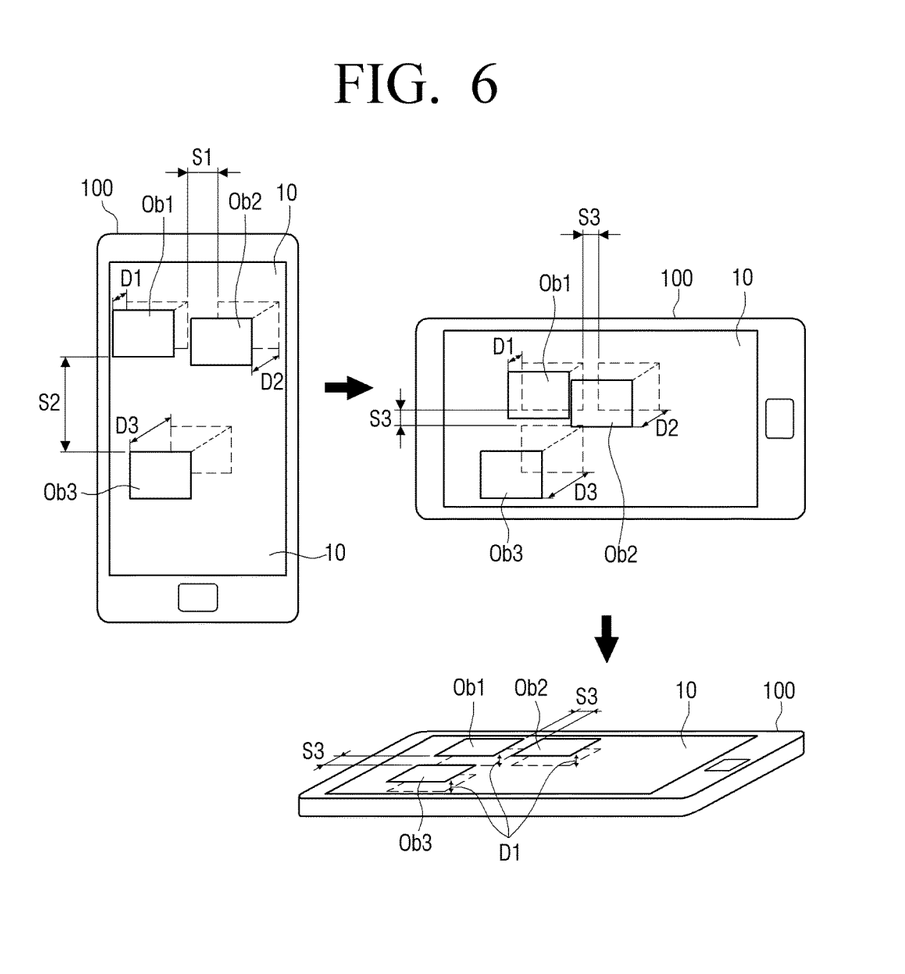

FIG. 6 illustrates a 3D display method according to still another embodiment of the present invention. Referring to FIG. 6, if the 3D display apparatus 100 is rotated to the second state in a state in which the 3D screen 10 that includes the plurality of objects Ob1, Ob2, and Ob3 having different depth perceptions D1, D2, and D3 is displayed, the layout of the 3D screen 10 is changed while the depth perceptions of the respective objects Ob1, Ob2, and Ob3 are maintained. Accordingly, the respective objects Ob1, Ob2, and Ob3 having different distances s1 and s2 are arranged so that they have a constant distance such as s3.

If the 3D display apparatus 100 moves to the first state in the above-described state, the depth perceptions of the respective objects Ob1, Ob2, and Ob3 are unified into one depth perception in a state in which the layout of the 3D screen 10 is changed. FIG. 6 shows the state in which the depth perceptions are unified into D1.

Although FIGS. 5 and 6 show that the 3D display apparatus 100 moves to the second state and then moves to the first state, the 3D display apparatus 100 may first move to the first state and then moves to the second state. In this case, the depth perception adjustment is first performed, and then the menu display or the layout change is performed when the 3D display apparatus 100 moves to the second state.

Further, even in the embodiments shown in FIGS. 5 and 6, if the 3D display apparatus 100 moves to the previous state or to the original state, the screen display state may return to the previous state or the original state.

The types of 3D display methods as shown in FIGS. 2 to 6 may be performed through the 3D display apparatus 100 having the configuration as shown in FIG. 1. Although FIG. 1 illustrates the essential configuration to execute the various types of 3D display methods, an interface for connecting to an external server or device, a storage unit for storing various types of content, programs, and data, a keypad, and a touch screen, may be additionally configured.

Figure 7:
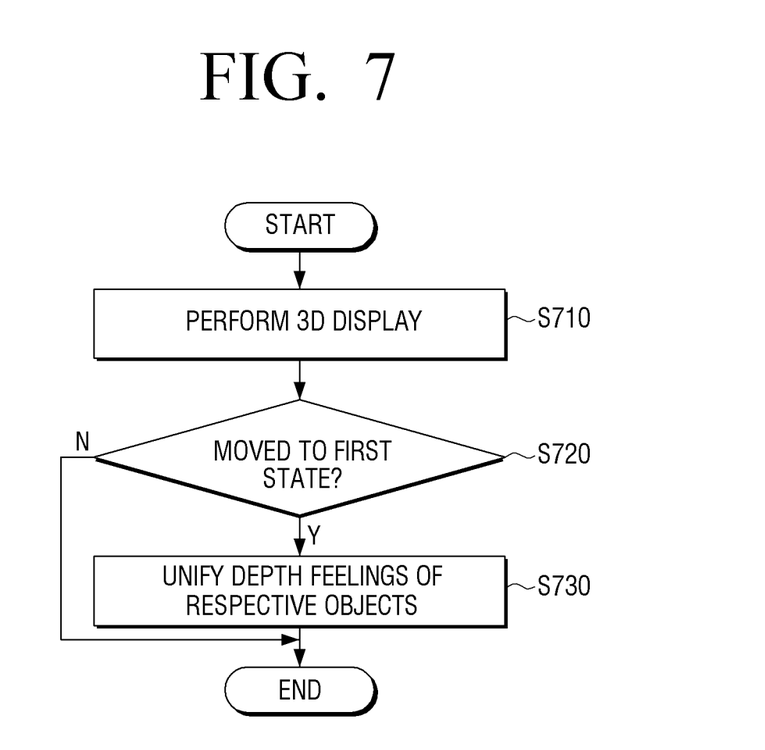
FIGS. 7 and 8 illustrate a 3D display method according to diverse embodiments of the present invention.

FIG. 7 illustrates a 3D display method according to an embodiment of the present invention.

Referring to FIG. 7, if it is sensed that the 3D display apparatus moves to the first state in step S720 in a state in which the 3D screen including at least one object is displayed in step S710, the depth perceptions of the objects that are displayed on the 3D screen are adjusted to be unified into one depth perception in step S730. Accordingly, the user can stably control the operation of the 3D display apparatus.

According to the embodiments of the present invention, the menu may be displayed along with the depth perception adjustment as shown in FIG. 3, or the layout may be changed as shown in FIG. 4.

Figure 8:
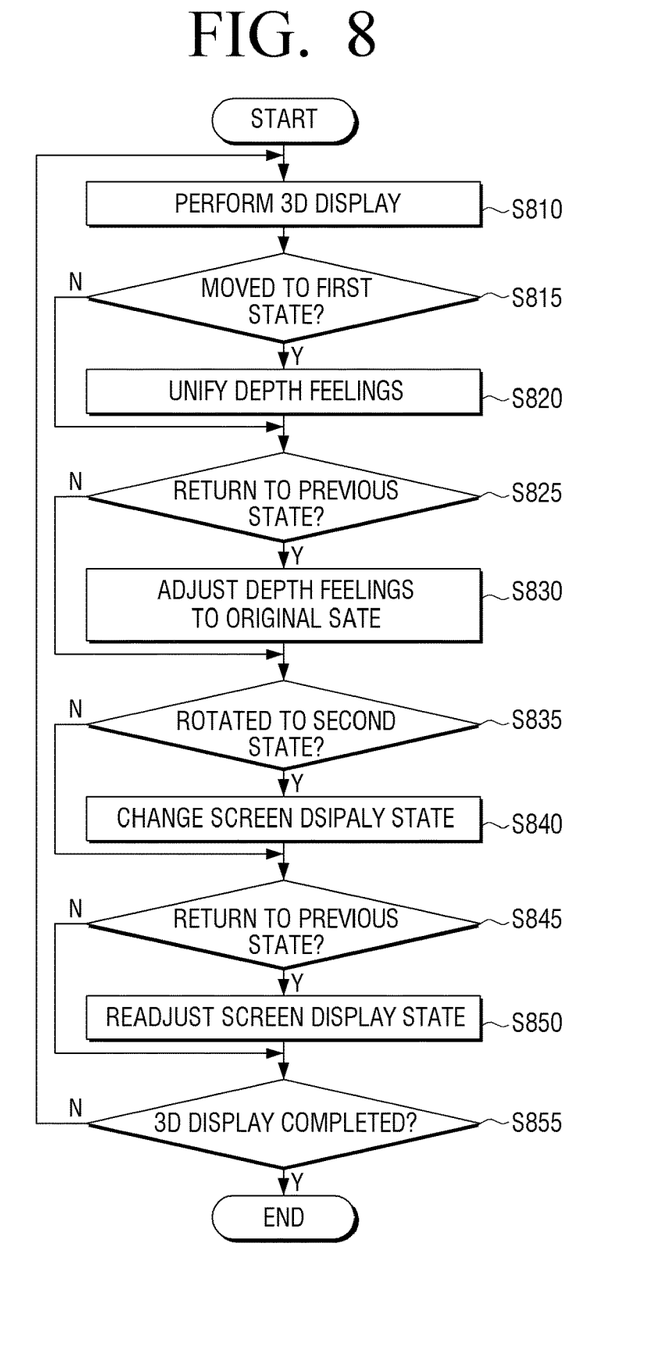

FIG. 8 illustrates a 3D display method according to another embodiment of the present invention.

Referring to FIG. 8, if the 3D display apparatus moves to the first state in step S815 in a state in which the 3D screen including at least one object is displayed in step S810, the depth perceptions of the objects are adjusted to be unified into one depth perception in step S820.

If the 3D display apparatus moves in the opposite direction and returns to the original state in the above-described state in step S825, the depth perception is readjusted to the original state in step S830.

If the 3D display apparatus is rotated to the second state in step S835, the screen display state is changed in step S840. Specifically, the change of the screen display state may be a process of additionally displaying a menu on the 3D screen or a process of changing the layout through rearrangement of the objects on the 3D screen.

If the 3D display apparatus returns from the second state to the previous state in step S845, the screen display state is readjusted to the previous state in step S850. These steps are performed until the 3D display is finished in step S855. Although FIG. 8 illustrates that the rotation of the 3D display apparatus to the second state is performed after the 3D display apparatus is rotated to the first state, the order of performing the above-described steps is not limited.

As described above, the first state and the second state may be defined as states, and the layout may also be changed in diverse manners.

A program for performing the methods according to embodiments of the present invention as described above may be stored in various types of recording media.

Specifically, such a program may be stored in various types of recording media that can be read by a terminal, such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, a memory card, a Universal Serial Bus (USB) memory, and a CD-ROM.

While the present invention has been shown and described with reference to certain embodiments thereof, it will be understood by those skilled in the art that changes in form and detail may be made therein without departing from the spirit and scope of the present invention, as defined by the appended claims.

What is claimed is:

1. A method for displaying a plurality of objects on a three-dimensional (3D) display apparatus comprising:
    displaying the plurality of objects with different depth perceptions in a first layout on a 3D screen of the 3D display apparatus, wherein, in the first layout, distances between the plurality of objects are different from one another;
    detecting a rotation of the 3D display apparatus;
    in response to detecting the rotation of the 3D display apparatus to a first state, changing the different depth perceptions to a same depth perception and displaying the plurality of objects with the same depth perception while the first layout is maintained; and
    in response to detecting the rotation of the 3D display apparatus to a second state, changing the first layout to a second layout and displaying the plurality of objects in the second layout while the different depth perceptions are maintained,
    wherein, in the second layout, the plurality of objects are spaced apart from one another by one of the distances.

2. The 3D display method as claimed in claim 1, further comprising displaying a menu corresponding to the 3D screen on the 3D screen, when the 3D display apparatus rotates to the first state.

3. The 3D display method as claimed in claim 1, further comprising displaying the 3D screen with the single depth perception that unifies the depth perceptions while changing the layout of the 3D screen so that the plurality of objects displayed on the 3D screen are arranged to be spaced apart from one another for a predetermined distance, when the 3D display apparatus rotates to the first state.

4. The 3D display method as claimed in claim 3, further comprising additionally displaying a menu corresponding to the 3D screen on the 3D screen, when the 3D display apparatus is rotated to the second state.

5. The 3D display method as claimed in claim 4, further comprising removing the menu displayed on the 3D screen, when the 3D display apparatus returns from the second state to a previous state of the rotation.

6. The 3D display method as claimed in claim 1, further comprising changing a layout of the 3D screen so that the plurality of objects displayed on the 3D screen are arranged to be spaced apart from one another for a predetermined distance, when the 3D display apparatus is rotated to the second state.

7. The 3D display method as claimed in claim 6, further comprising changing the layout of the 3D screen so that the plurality of objects are rearranged to the first layout, when the 3D display apparatus returns from the second state to a previous state of the rotation.

8. The 3D display method as claimed in claim 4, wherein in the second state, the display apparatus is rotated in a horizontal or vertical direction.

9. The 3D display method as claimed in claim 1, further comprising adjusting the depth perceptions of the plurality of objects to original different depth perceptions if the 3D display apparatus returns from the first state to an original state of the rotation.

10. The 3D display method as claimed in claim 9, wherein the first state is one of a horizontal state in which the 3D display apparatus is horizontally put on a ground surface, a state in which the 3D display apparatus is rotated in a horizontal or vertical direction, a state in which the 3D display apparatus is inclined over a predetermined inclination, a state in which the 3D display apparatus is rotated over a predetermined rotating angle, a state in which the 3D display apparatus rotates toward or away from a user side while maintaining the inclination, and a state in which the 3D display apparatus rotates to form a specified pattern.

11. A Three-Dimensional (3D) display apparatus comprising:
  a display configured to display a plurality of objects with different depth perceptions in a first layout, wherein, in the first layout, distances between the plurality of objects are different from one another;
  a sensor configured to detect a rotation of the 3D display apparatus; and
  a controller configured to
    in response to detecting the rotation of the 3D display apparatus to a first state, change the different depth perceptions to a same depth perception and control the display to display the plurality of objects with the same depth perception while the first layout is maintained,
    in response to detecting the rotation of the 3D display apparatus to a second state, change the first layout to a second layout and control the display to display the plurality of objects in the second layout while the different depth perceptions are maintained,
    wherein, in the second layout, the plurality of objects are spaced apart from one another by one of the distances.

12. The 3D display apparatus as claimed in claim 11, wherein the controller is configured to control the display to display a menu on a 3D screen, when the 3D display apparatus rotates to the first state.

13. The 3D display apparatus as claimed in claim 12, wherein the controller is configured to control the display to unify the depth perceptions of the plurality of objects while changing the layout of the 3D screen so that the plurality of objects displayed on the 3D screen are arranged to be spaced apart from one another for a distance, when the 3D display apparatus rotates to the first state.

14. The 3D display apparatus as claimed in claim 13, wherein the controller is configured to control the display to additionally display a menu corresponding to the 3D screen on the 3D screen, when the 3D display apparatus is rotated to the second state.

15. The 3D display apparatus as claimed in claim 14, wherein the controller is configured to control the display to remove the menu displayed on the 3D screen, when the 3D display apparatus returns from the second state to a previous state of the rotation.

16. The 3D display apparatus as claimed in claim 11, wherein the controller is configured to control the display to change a layout of the 3D screen so that the plurality of objects displayed on the 3D screen are arranged to be spaced apart from one another for a predetermined distance, when the 3D display apparatus is rotated to the second state.

17. The 3D display apparatus as claimed in claim 16, wherein the controller is configured to control the display to change the layout of the 3D screen so that the plurality of objects are rearranged to the first layout, when the 3D display apparatus returns from the second state to a previous state of the rotation.

18. The 3D display apparatus as claimed in claim 14, wherein in the second state, the display apparatus is configured to rotate in a horizontal or vertical direction.

19. The 3D display apparatus as claimed in claim 11, wherein the controller is configured to control the display to adjust the depth perceptions of the plurality of objects to original different depth perceptions, when the 3D display apparatus returns from the first state to an original state of the rotation.

20. The 3D display apparatus as claimed in claim 19, wherein the first state is one of a horizontal state in which the 3D display apparatus horizontally put on a ground surface, a state in which the 3D display apparatus is rotated in a horizontal or vertical direction, a state in which the 3D display apparatus is inclined over a predetermined inclination, a state in which the 3D display apparatus is rotated over a predetermined rotating angle, a state in which the 3D display apparatus rotates toward or away from a user side while maintaining the inclination, and a state in which the 3D display apparatus rotates to form a specified pattern.

* * * * *